(12) United States Patent
Chen

(10) Patent No.: US 6,742,891 B2
(45) Date of Patent: Jun. 1, 2004

(54) COUPLING SYSTEM FOR SECURING A ONE-PIECE LENS TO TEMPLES

(75) Inventor: Chih-Lung Chen, Tainan (TW)

(73) Assignee: High Rainbow Ent. Co., Ltd., Tainan (TW)

( * ) Notice: Subject to any disclaimer, the term of this patent is extended or adjusted under 35 U.S.C. 154(b) by 0 days.

(21) Appl. No.: 10/246,464

(22) Filed: Sep. 19, 2002

(65) Prior Publication Data

US 2004/0057009 A1 Mar. 25, 2004

(51) Int. Cl.⁷ ............................. G02C 5/00; G02C 5/14
(52) U.S. Cl. ...................... 351/140; 351/106; 351/121
(58) Field of Search ....................... 351/41, 51, 52, 351/103–106, 110, 116, 121, 140–143, 154

(56) References Cited

U.S. PATENT DOCUMENTS

| | | | |
|---|---|---|---|
| 5,387,949 A | * | 2/1995 | Tackles ...................... 351/121 |
| 5,592,242 A | * | 1/1997 | Ooie ........................... 351/44 |
| 5,748,281 A | * | 5/1998 | Simioni et al. ............. 351/121 |
| 6,102,542 A | * | 8/2000 | Masuda ...................... 351/110 |

* cited by examiner

Primary Examiner—Huy Mai
(74) Attorney, Agent, or Firm—Rosenberg, Klein & Lee

(57) ABSTRACT

A coupling system for securing a one-piece lens to temples includes a pair of temples, a one-piece lens and a pair of marking blocks. Each temple has a cavity in the outer surface of the front head, a through hole is provided in each cavity, a room is formed in each front head, and each room has a rear end portion. The one-piece lens has both inserting ends, and a hole is provided near each inserting end. Each marking block is made to be a certain configuration, an inserting hook is provided at the rear of each marking block, the bottom end of each inserting hook has a stopping member, and marks or characters may be provided on the front surface of each marking block.

1 Claim, 6 Drawing Sheets

COUPLING SYSTEM FOR SECURING A ONE-PIECE LENS TO TEMPLES

BACKGROUND OF THE INVENTION

1. Field of the Invention

This invention relates to a coupling system for securing a one-piece lens to temples with innovatory convenience and security features, and more particularly to a coupling system for a one-piece lens to be easily and promptly assembled with both temples and to secure the best spherical condition of the one-piece lens.

2. Description of the Related Art

There are more and more people who have poor eyesight and must wear eyeglasses to obtain better eyesight. Besides, most people like to do outdoor activities, and they must wear sunglasses to prevent strong sunrays from hurting their eyes. Many people whose eyes may be hurt by strong rays while working must wear industrial safety glasses to protect their eyes. Therefore, various kinds of glasses are indispensable for modern people in daily life.

A common conventional eyeglasses 40, as shown in FIG. 1, is composed by a spectacle frame 41 and a pair of lenses 42. The frame 41 of the eyeglasses 40 is easily squeezed to transform by external force, and the spherical focal distances of both lenses 42 will become improper because the angles of both lenses 42 do not accord with each other. Therefore, a wearer's eyesight will be influenced and the wearer will riot feel comfortable while wearing the 1 transformed eyeglasses 40.

Referring to FIG. 2, another kind of conventional glasses includes a one-piece lens 51 and a spectacle frame 52. The lens 51 is assembled with the frame 52 by screws. It is more convenient than the eyeglasses 40 when being assembled, but it still wastes time and cost to be assembled by screws. Besides, the spherical angle of the lens 51 will be influenced because of non-balanced external force or loose screws.

SUMMARY OF THE INVENTION

Therefore, the present invention is to provide a coupling system for securing a one-piece lens to temples that can substantially obviate the drawbacks of the related conventional arts.

An objective of the present invention is to provide a coupling system for easily and promptly securing a one-piece lens to temples without any tool, so as to save cost and time for assembly.

Another objective of the present invention is to provide a coupling system that can secure the best spherical condition of the one-piece lens and have beautiful appearance after the one-piece lens being coupled to temples.

Yet another objective of the present invention is to provide a coupling system for securing a one-piece lens to temples whose marking blocks can be provided with designs or characters on the surface.

Accordingly, a coupling system for securing a one-piece lens to temples in the present invention includes a pair of temples, a one-piece lens and a pair of marking blocks. Each temple has a cavity in the outer surface of the front head, a through hole is provided in each cavity, a room is formed in each front head, and each room has a rear end portion. The one-piece lens has both inserting ends, and a hole is provided near each inserting end. Each marking block, is made to be a certain configuration, an inserting hook is provided at the rear of each marking block, the bottom end of each inserting hook has a stopping member, and marks or characters may be provided on the front surface of each marking block.

BRIEF DESCRIPTION OF THE DRAWINGS

Other features and advantages of the present invention will become apparent in the following detailed description of the preferred embodiments with reference to the accompanying drawings, in which

FIGS. 4–1 is an enlarged cross sectional view taken from the circle in FIG. 4;

DETAILED DESCRIPTION OF THE PREFERRED EMBODIMENTS

Figure 3:
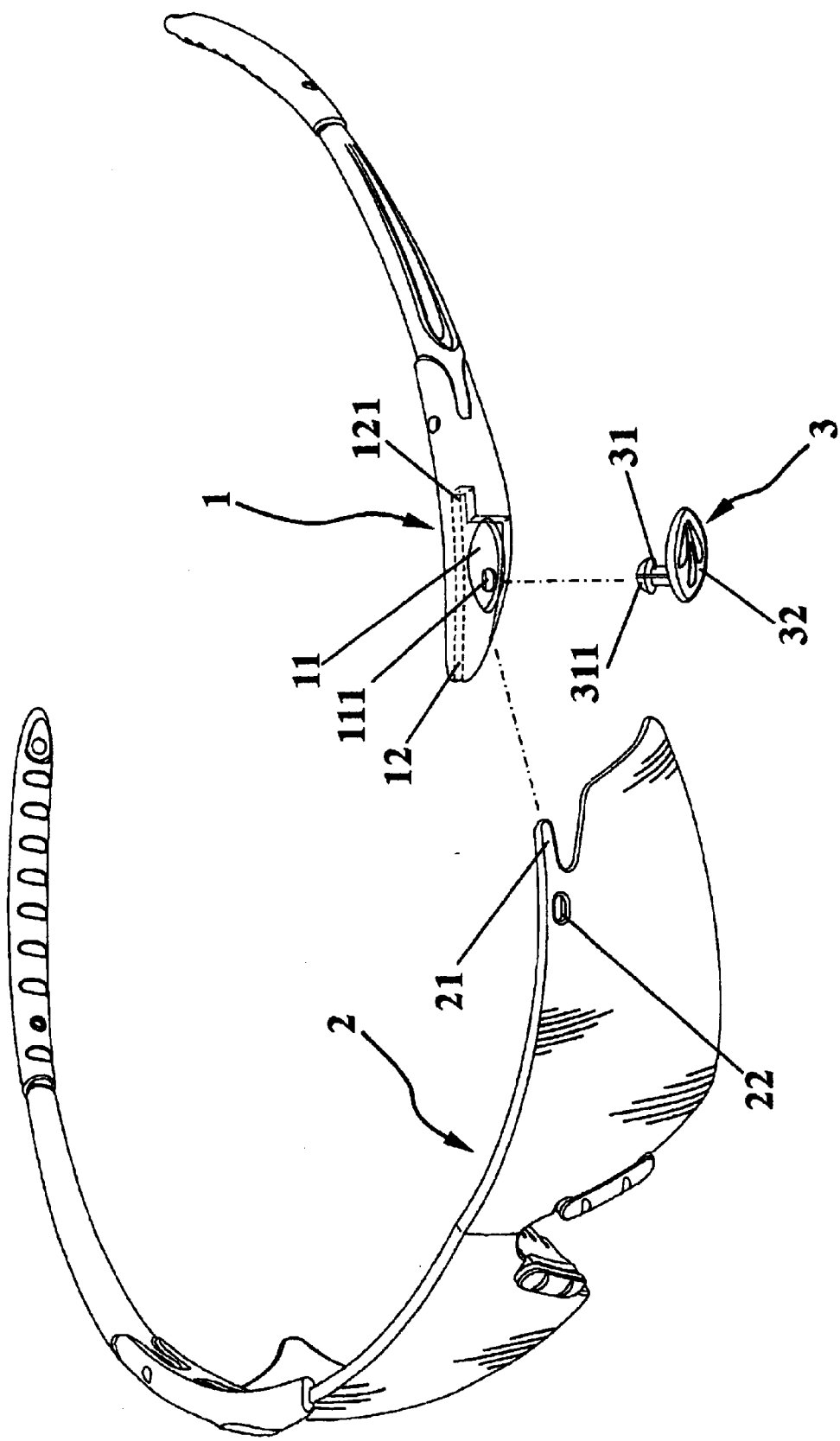
FIG. 3 is an exploded perspective view of an embodiment of the coupling system for securing a one-piece lens to temples in accordance with the present invention.

Referring to FIG. 3, a coupling system for securing a one-piece lens to temples in the present invention includes a pair of temples 1, a one-piece lens 2 and a pair of marking blocks 3.

Each temple 1 has a cavity 11 in the outer surface of the front head, a through hole 111 is provided in each cavity 11, a room 12 is formed in each front head, and each room 12 has a rear end portion 121.

The one-piece lens 2 has both inserting ends 21, and a hole 22 is provided near each inserting end 21.

Figure 5:
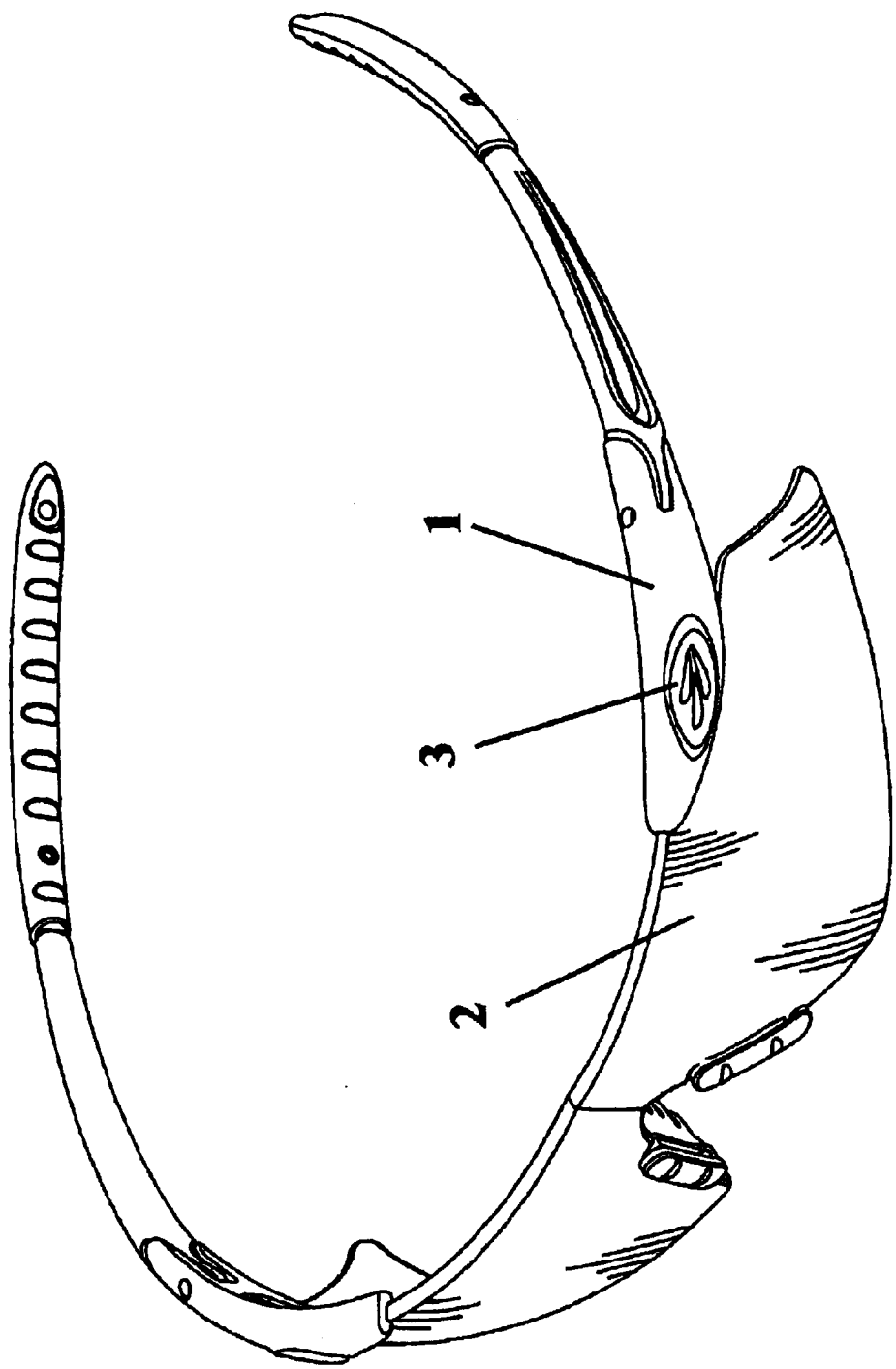
FIG. 5 is a perspective view of an embodiment of the one-piece lens and temples in an assembled configuration in accordance with the present invention, and, FIG. 6 is a perspective view of another embodiment of the one-piece lens and temples in an assembled configuration in accordance with the present invention.
Figure 6:
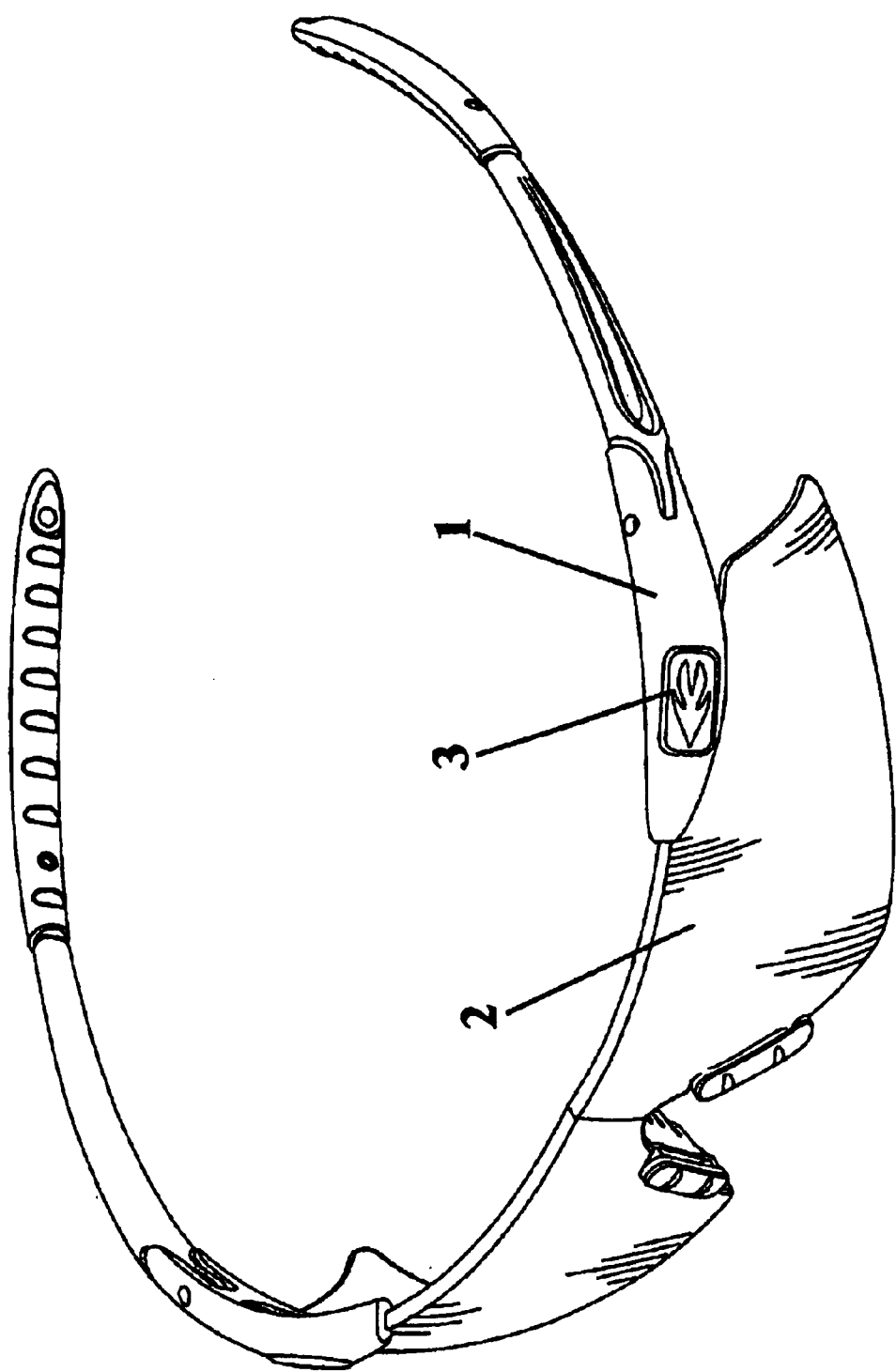

Each marking block 3 is made to be a predetermined configuration, referring to FIGS. 5 and 6. An inserting hook 31 is provided at the rear of each marking block 3, the bottom end of each inserting hook 31 has a stopping member 311, and marks or characters may be provided on the front surface 32 of each marking block 3, referring to FIGS. 5 and 6.

Figure 1:
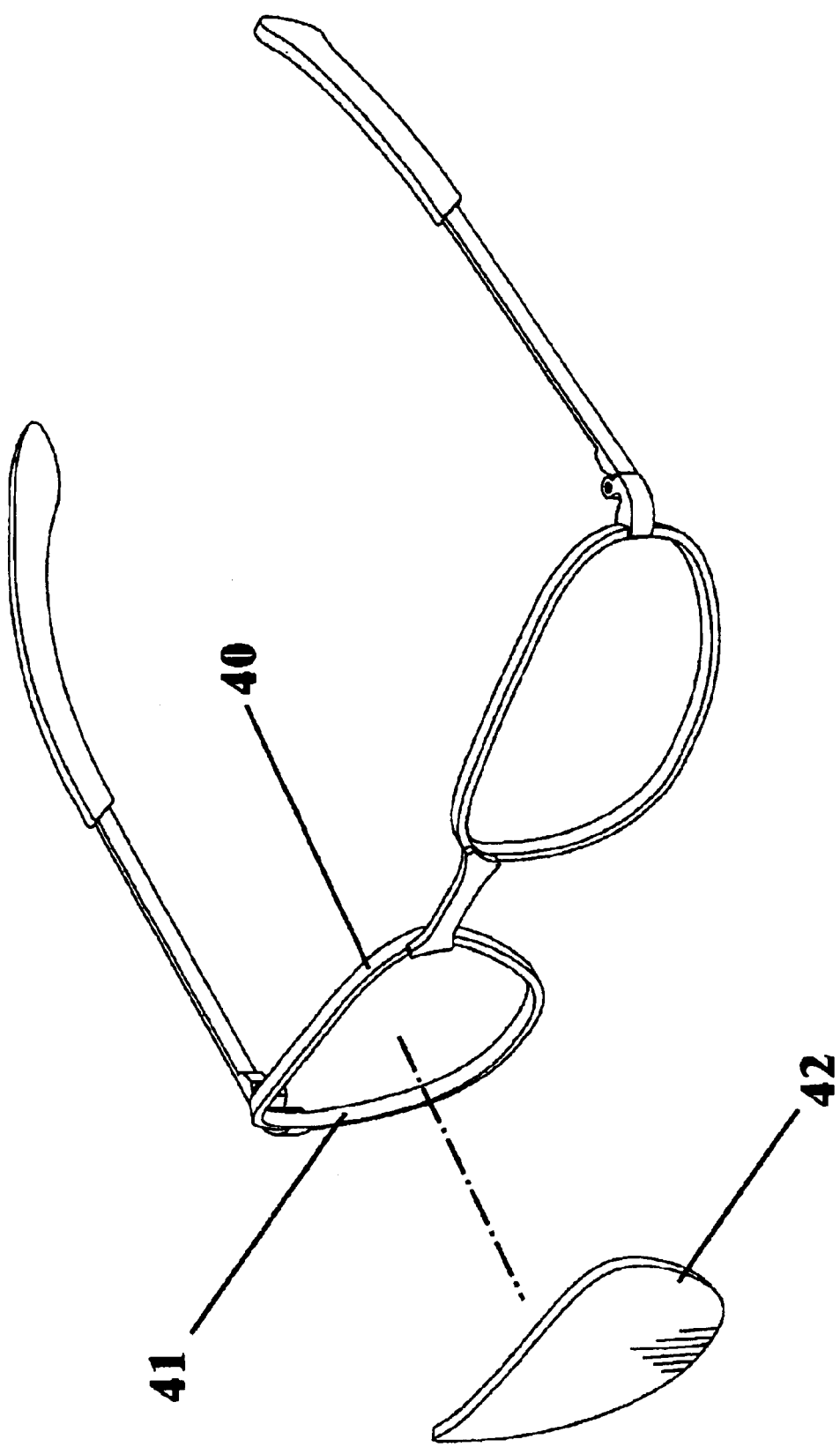
FIG. 1 is an exploded perspective view of a conventional eyeglasses frame and lens.
Figure 2:
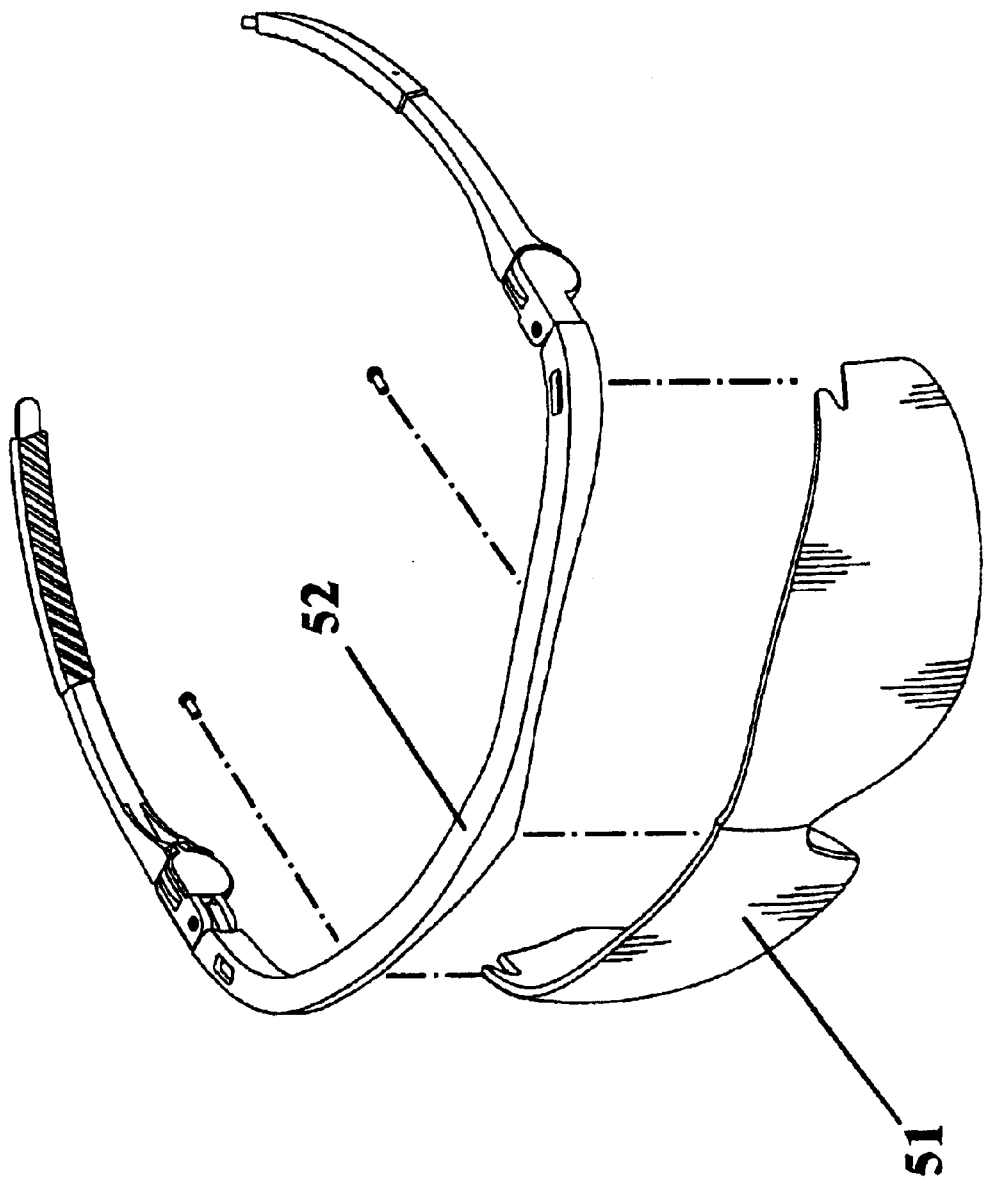
FIG. 2 is an exploded view of a conventional elongated frame and one-piece lens.
Figures 1, 4:
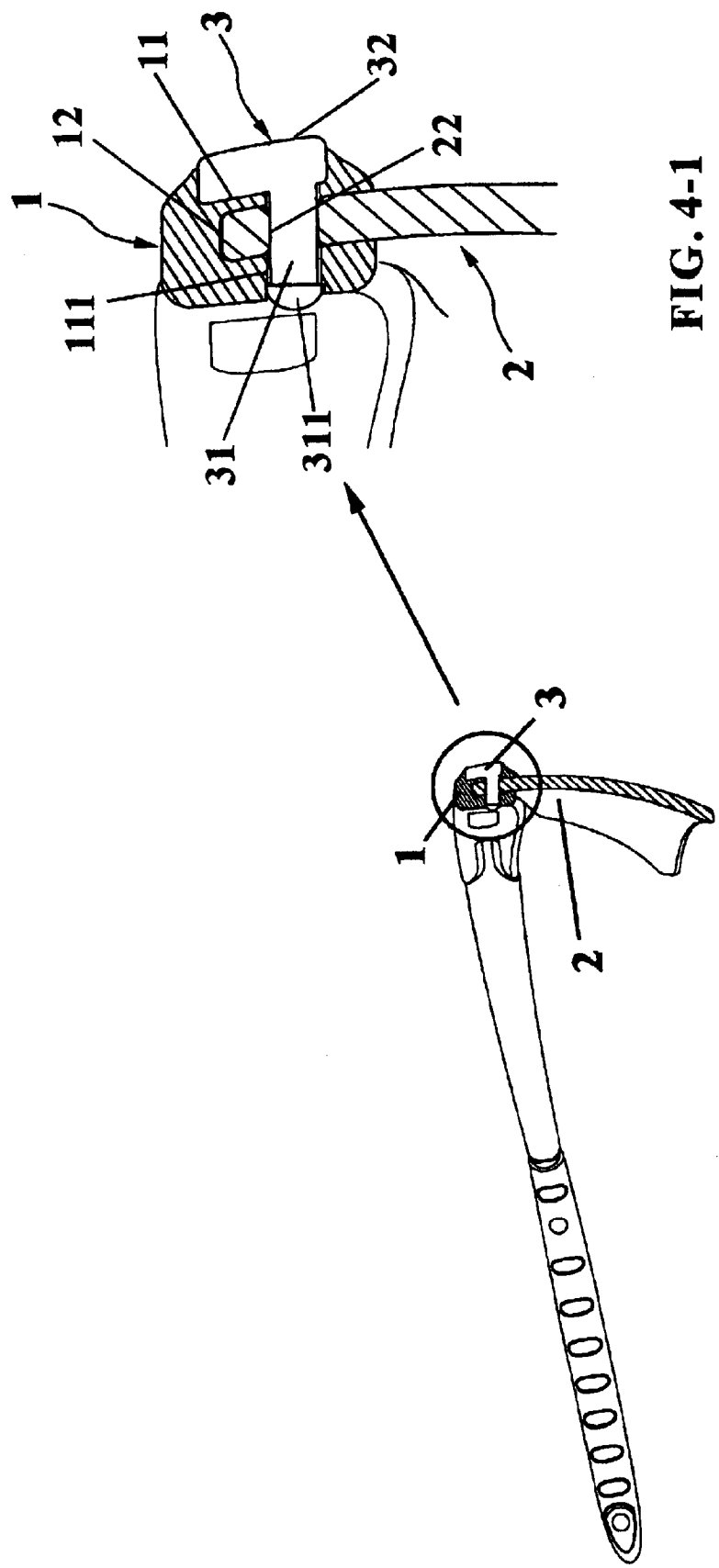
FIG. 4 is a cross sectional view of the coupling system in an assembled configuration in accordance with the present invention.

While being assembled, referring to FIGS. 4 and 4–1, each upper end portion of the one-piece lens 2 is inserted into each room 12 of each temple 1, each inserting end 21, of the one-piece lens 2 is inlaid in each rear end portion 121 of each room 12, and each hole 22 of the one-piece lens 2 is registered with each through hole 111 in each cavity 11. Each inserting hook 31 of each marking block 3 is inserted into each through hole 111 as well as each hole 22, each marking block 3 is inlaid in each cavity 11, and each stopping member 311 of each inserting hook 31 is outward each through hole 111 and stopped by the inner wall of each temple 1, so as for the one-piece lens 2 and both temples 1 to be firmly assembled.

While the preferred embodiments of the invention have been described above, it will be recognized and understood that various modifications may be made therein, and the appended claims are intended to cover all such modifications which may fall within the spirit and scope of the invention.

What is claimed is:

1. An eyeglass assembly and coupling system therefor, comprising:

a one-piece lens having a pair of inserting ends respectively formed in opposing end portions thereof, each of said end portions having a hole formed therethrough adjacent a respective one of said inserting ends:

a pair of temples respectively secured to said opposing end portions of said one-piece lens, each of said temples having a longitudinally extending front head portion with a room extending longitudinally therein, said room having a rear end portion, said front head portion having a cavity formed in an outer surface thereof and a through hole disposed in said cavity, said through hole extending through said front head portion and being in open communication with said room, each said end portion of said one-piece lens being received in said room of said front head portion of a respective temple, each said inserting end of said one-piece lens contacting said rear end portion of a respective room and said hole in each said end portion being disposed in aligned relationship with a through hole of a respective one of said front head portions; and, a pair of marking blocks respectively having an upper surface with a predetermined configuration and an inserting hook extending from a rear surface thereof, said inserting hook having a stopping member at a distal end thereof, each said marking block being disposed in a respective one of said cavities with said inserting hook thereof being passing through said through hole and said corresponding hole of said one-piece lens and said stopping member engaging an inner side of said front head portion to thereby secure said temples to said one-piece lens.

* * * * *